US008311483B2

(12) United States Patent
Tillman et al.

(10) Patent No.: US 8,311,483 B2
(45) Date of Patent: Nov. 13, 2012

(54) RADIO WHITE SPACE SENSING

(75) Inventors: Fredrik Tillman, Lund (SE); Anders Rosenqvist, Lund (SE); Lars Sundström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 239 days.

(21) Appl. No.: 12/720,281

(22) Filed: Mar. 9, 2010

(65) Prior Publication Data

US 2011/0223877 A1 Sep. 15, 2011

(51) Int. Cl.
*H04B 15/00* (2006.01)
(52) U.S. Cl. .................. 455/62; 455/522; 455/226.2
(58) Field of Classification Search .............. 455/62, 455/69, 226.2, 230, 452.1, 522; 370/335, 370/342, 350, 329, 330
See application file for complete search history.

(56) References Cited

U.S. PATENT DOCUMENTS

| 5,412,686 | A | 5/1995 | Ling |
| 6,587,696 | B1 | 7/2003 | Ma et al. |
| 6,856,611 | B2 * | 2/2005 | Chaudhuri et al. ........... 370/335 |
| 7,526,041 | B2 | 4/2009 | Kakura et al. |
| 2002/0181557 | A1 | 12/2002 | Fujii |
| 2006/0003787 | A1 * | 1/2006 | Heo et al. ...................... 455/522 |
| 2006/0067354 | A1 | 3/2006 | Waltho et al. |
| 2007/0135059 | A1 | 6/2007 | Yomo et al. |
| 2007/0201405 | A1 | 8/2007 | Santhanam |
| 2007/0242782 | A1 | 10/2007 | Han et al. |
| 2008/0112360 | A1 | 5/2008 | Seidel et al. |
| 2008/0112426 | A1 | 5/2008 | Seidel et al. |
| 2008/0112427 | A1 | 5/2008 | Seidel et al. |
| 2008/0113667 | A1 | 5/2008 | Seidel et al. |
| 2008/0192720 | A1 | 8/2008 | Frederiksen et al. |
| 2008/0198948 | A1 | 8/2008 | Tang |
| 2008/0207248 | A1 | 8/2008 | Tang |
| 2008/0268892 | A1 | 10/2008 | Hamdi et al. |
| 2009/0122757 | A1 | 5/2009 | Cave et al. |
| 2009/0124208 | A1 | 5/2009 | Mody et al. |
| 2009/0163221 | A1 | 6/2009 | Abedi |
| 2009/0232062 | A1 * | 9/2009 | Higuchi et al. ............... 370/329 |
| 2010/0087202 | A1 * | 4/2010 | Ventola et al. ............ 455/452.1 |

OTHER PUBLICATIONS

PCT International Search Report, dated Jun. 30, 2011, in connection with International Application No. PCT/EP2011/053323.
PCT Written Opinion, dated Jun. 30, 2011, in connection with International Application No. PCT/EP2011/053323.
Blaschke, V. et al. "A Cognitive Radio Receiver Supporting Wide-Band Sensing", IEEE International Conference on Communications Workshops, May 19, 2008, IEEE, Piscataway, NJ, USA, pp. 499-503, XP031265288, ISBN: 978-1-4244-2052-0.

(Continued)

*Primary Examiner* — Lana N Le
*Assistant Examiner* — Golam Sorowar
(74) *Attorney, Agent, or Firm* — Potomac Patent Group PLLC (57) ABSTRACT

User equipment comprising a receiver obtains information about a set of channels to be sensed in a sensing process, wherein each channel is associated with a respective one of a number of radio frequencies. The receiver obtains a radio frequency signal by simultaneously sensing two or more of the channels included in the set of channels. A total power level of the sensed two or more channels is measured, and a comparison result is generated by comparing the total power level of the sensed two or more channels with a predetermined power level. The user equipment is controlled based on the comparison result. For example, if the total power level is below a threshold, then the sensed channels can be considered to not be in use by external transmission equipment.

10 Claims, 6 Drawing Sheets

OTHER PUBLICATIONS

Zhi Quan et al. "Optimal Multiband Joint Detection for Spectrum Sensing in Cognitive Radio Networks", IEEE Transactions on Signal Processing, IEEE Service Center, New York, NY, US, vol. 57, No. 3, Mar. 1, 2009, pp. 1128-1140, XP011248851, ISSN: 1053-587X.

* cited by examiner

RADIO WHITE SPACE SENSING

BACKGROUND

The present invention relates to wireless communications, and more particularly to the sensing of wireless transmissions from a user of a spectral resource.

Figure 1:
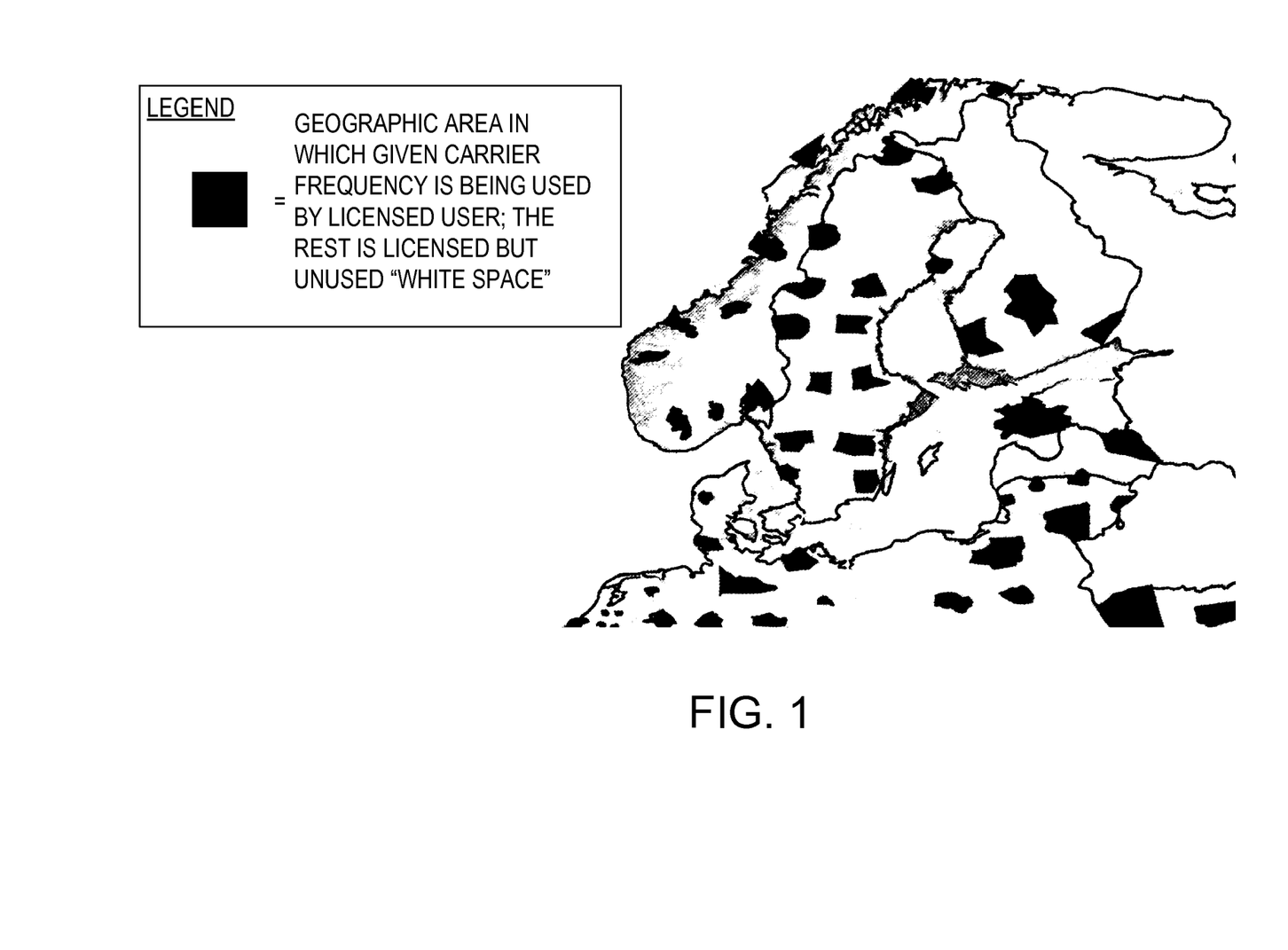
FIG. 1 illustrates geographical areas constituting so-called "white spaces" located in Scandinavia.

The radio spectrum is a limited resource that should be shared between many different types of equipment such as cellular, home network, broadcast, and military communication equipment. Historically, each part of the radio spectrum has been allocated to a certain use (called a "licensed" and/or "primary" use). This strategy has resulted in all applications/ uses being disallowed on the allocated carrier frequency except for those applications included in the license agreement. In practice, this results in large parts of the radio spectrum being unused much of the time. For instance, in the Ultra-High Frequency (UHF) band, where TV broadcasts take place, large geographical areas are unused, mainly due to the large output power needed for such applications; this large output power compels a large reuse distance in order to minimize the risk of interference. An example of such geographical areas within Scandinavia is illustrated in FIG. 1. In FIG. 1, the shaded areas represent geographic locations in which a given carrier frequency is being used by a licensed user (e.g., by Broadcast TV). In the remaining areas, the so-called "white spaces", the given carrier frequency is allocated to the licensed user but is not actually being used by that user.

In order to make better use of the licensed spectral resources, some countries will, in the future, allow unlicensed services (so called "secondary" uses) to take place in areas (called "white spaces") in which the licensed (primary or "incumbent") user is not transmitting. However the primary user will always have priority for the use of the spectrum to the exclusion of others. Therefore, some sort of mechanism needs to be in place to ensure that the unlicensed users are not causing interference to the licensed user.

One mechanism is to install the unlicensed network in a geographical area where at least some parts of the licensed spectra are known to be unused.

However, even more use of the white space can be made if the non-interference mechanism adopts a detection strategy in which it operates on the licensed frequency (or frequencies) in the white space only so long as no licensed user transmissions are detected, and ceases such operation as soon as licensed user transmissions are detected. In this context, ceasing operation may mean ceasing all operation, or alternatively may mean ceasing operation only on those frequencies that are detected as being "in use", and otherwise continuing to operate on other frequencies in the white space. Detection of power or other signal strength measurements indicative of power being present on a given frequency band is used to indicate active use on that radio spectrum. An example of a white space system currently being standardized is IEEE 802.22.

Another consideration regarding the sensing of the licensed user's transmissions is placement of the sensors. When the secondary (e.g., unlicensed) use is for cellular telecommunications, one solution is to include the sensors in the base station of the mobile communication system. Sometimes, the base station's (or network's) own sensors do not provide enough information (e.g., information about the geographical positions of active white space transmitters) for the base stations to have a clear picture of white space spectrum availability as a function of geographical position. Without this information, it is difficult for a base station to use the white space fully. To compensate for this lack of information, it may be necessary to impose quite wide safety margins (for example with respect to frequency and/or power) in order to prevent the unlicensed user's interfering with the primary (licensed) user's use of white space frequencies.

As an alternative to locating the sensors at the base station, dedicated sensors can be distributed throughout the white space. However, this increases the complexity and cost of network implementation within the white space.

An alternative way of achieving a distributed set of sensors throughout the white space is to have sensing performed by each of the mobile terminals that are located within the white space. Each of these mobile terminals performs a sensing operation, and reports its findings to a main node (e.g., the mobile terminal's serving base station), the findings being either in the form of raw data or as some sort of processed data.

A problem that is encountered with respect to the white space radio scenario is the lack of regulation when it comes to interferers. Since this information is not known by the system, information about available spectrum must be collected and analyzed by the system before initiating any data transmission. More particularly, in a white space radio scenario, a User Equipment (UE) may, acting in the capacity of white space sensor, be responsible for using its own antenna(s) to sense (measure) the received power of radio signals within different parts of the radio spectrum. For example, a UE may have the task of sensing which DVB-T channels have a received power above some certain threshold. (The pattern of where the channels may appear in the spectrum is most certainly known.) One might also consider the use of a positioning system like GPS in combination with a database (e.g., stored in the UE and optionally received from a server) to enable further details to be made available regarding expected channel use patterns with respect to a given position.

Today, this type of sensing function may be performed one channel at a time. The sensing of a single channel is permitted to continue until the probability of having a received power above the certain threshold is less than some acceptable probability threshold. However, the time spent sensing each single channel one-by-one adds up, resulting in quite some time for the whole sensing task. The sensing task may thus consume a great deal of time, processor resources and/or battery, especially if it has to be done often and for a large total spectrum.

It is therefore desirable to have ways of sensing at the UE that save time, processor resources, and/or battery resources compared to today's ways of doing it.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses in which a user equipment having a receiver is operated. This operation includes obtaining information about a set of channels to be sensed in a sensing process, wherein each channel is associated with a respective one of a plurality of radio frequencies. The receiver obtains a radio frequency signal by simultaneously sensing two or more of the channels included in the set of channels. A total power level of the sensed two or more channels is measured, and a comparison result is generated by comparing the total power level of the sensed two or more channels with a predetermined power level. The user equipment is then controlled based on the comparison result.

In some embodiments, controlling the user equipment based on the comparison result comprises, for the duration of the sensing process, inhibiting further sensing of the two or more channels if the total power level of the sensed two or more channels is less than the predetermined power level.

In another aspect of some embodiments, controlling the user equipment based on the comparison result comprises sensing the two or more channels by means of a different sensing process if the total power level of the sensed two or more channels is not less than the predetermined power level. For example, the different sensing process can comprise measuring a total power level of at least one but fewer than all of the sensed two or more channels. The total power level of the at least one but fewer than all of the sensed two or more channels is then compared with the predetermined power level.

In another aspect of some embodiments, the information about the set of channels to be sensed is information that defines a contiguous range of frequencies spanning a bandwidth large enough to be associated with two or more channels. In some of these embodiments, operating the receiver to obtain a radio frequency signal by simultaneously sensing two or more of the channels included in the set of channels comprises operating the receiver to obtain a radio frequency signal by simultaneously sensing the contiguous range of frequencies spanning the bandwidth large enough to be associated with the two or more channels.

Considering such embodiments further, in some of them controlling the user equipment based on the comparison result comprises, for the duration of the sensing process, inhibiting further sensing of the contiguous range of frequencies spanning the bandwidth large enough to be associated with the two or more channels if the total power level of the sensed contiguous range of frequencies spanning the bandwidth large enough to be associated with the two or more channels is less than the predetermined power level.

In another aspect of some of such embodiments, operation of the user equipment includes indicating that the contiguous range of frequencies spanning the bandwidth large enough to be associated with the two or more channels is not in use by external transmission equipment if the total power level of the sensed contiguous range of frequencies spanning the bandwidth large enough to be associated with the two or more channels is less than the predetermined power level.

In another aspect of some embodiments, if the total power level of the contiguous range of frequencies spanning the bandwidth large enough to be associated with the two or more channels is not less than the predetermined power level, then the contiguous range of frequencies spanning the bandwidth large enough to be associated with the two or more channels is divided into two or more smaller contiguous ranges of frequencies, each spanning a bandwidth large enough to be associated with at least one channel. Operation then further includes sensing whether each of the smaller contiguous ranges of frequencies is associated with a received power level that is less than a respective one of a plurality of lower predetermined power levels. In some alternative embodiments, a single predetermined power level is used instead of the plurality of lower predetermined power levels.

In still another aspect, it may be the case that at least one of the smaller contiguous ranges of frequencies spans a bandwidth large enough to be associated with two or more channels. In such instances, some embodiments include, for each of the smaller contiguous ranges of frequencies that span a bandwidth large enough to be associated with two or more channels, operating the receiver to obtain a radio frequency signal by simultaneously sensing the smaller contiguous range of frequencies spanning the bandwidth large enough to be associated with the two or more channels.

In yet another aspect, the two or more channels to be simultaneously sensed are selected by means of a selection process that includes determining that each of the two or more channels has a corresponding estimated channel power level below a predetermined threshold power level.

BRIEF DESCRIPTION OF THE DRAWINGS

The objects and advantages of the invention will be understood by reading the following detailed description in conjunction with the drawings in which.

DETAILED DESCRIPTION

The various features of the invention are described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

These and other aspects are now described in further detail in the following.

In order to provide a context for understanding the utility of embodiments consistent with the invention, an application will be presented in which mobile terminals (so-called "User Equipments", or "UEs") in a mobile communication system are called upon to perform white space sensing due to their unlicensed operation in a white space, as discussed in the Background section above. It will be understood that this is presented merely for the purposes of illustration and is not intended to limit the scope of the invention. To the contrary, those of ordinary skill in the art will recognize that sensing functionality can be employed in many different applications having nothing to do with mobile communication.

Figure 2:
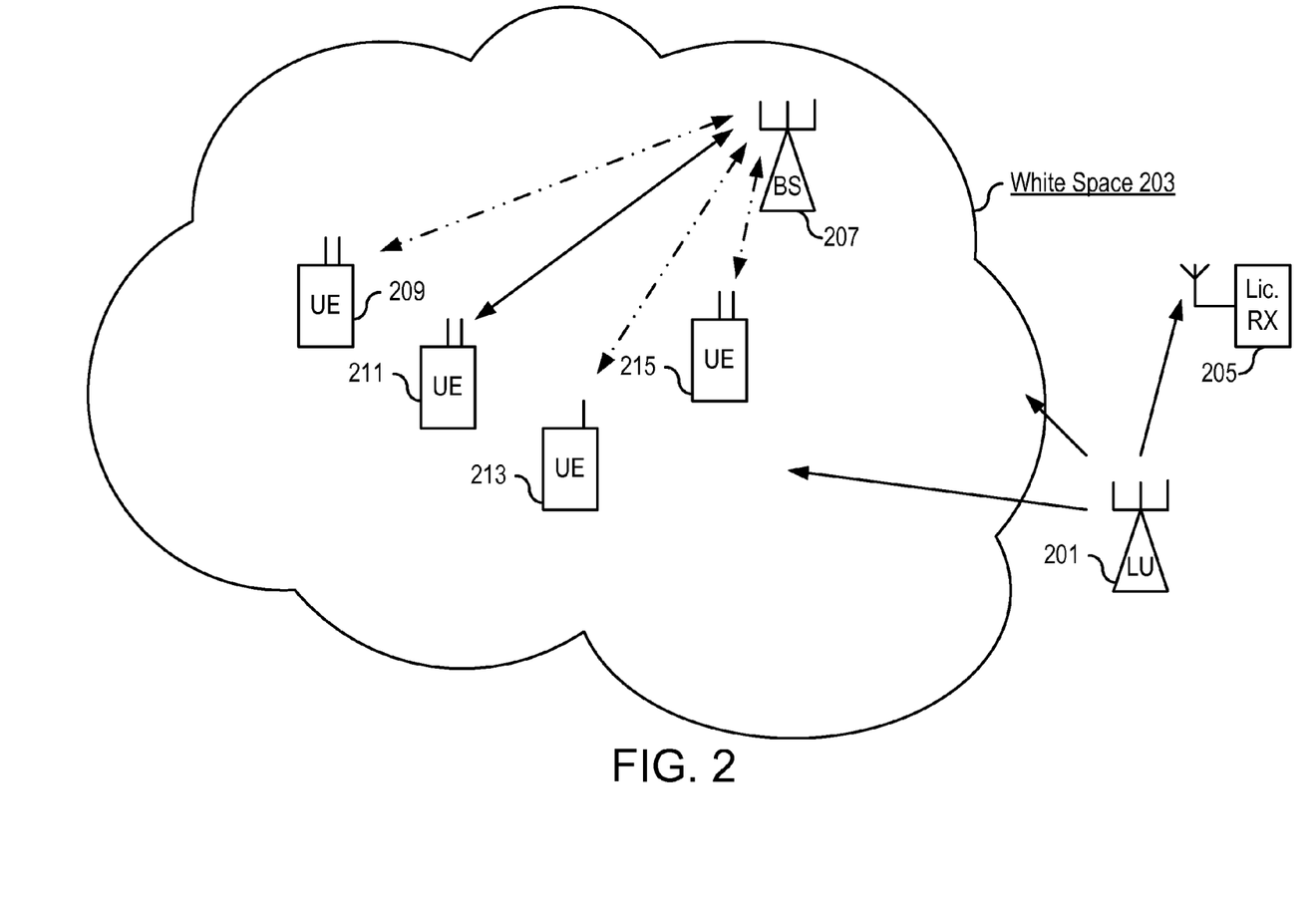
FIG. 2 is a block diagram of an exemplary system in which various aspects of the invention are deployed and utilized.

FIG. 2 is a block diagram of an exemplary system in which UEs are configured to use white space sensing functionality as provided by embodiments consistent with the invention. A licensed user (LU) 201 is depicted operating within a geographic area that includes a white space 203. Transmissions of the licensed user 201 are intended to be received by, for example, one or more licensed receivers, only one of which (the licensed receiver 205) is depicted. A mobile communication system is configured in accordance with various aspects of the invention to permit it to operate as an unlicensed user within the white space 203. The mobile communication system includes a serving base station 207 that serves one or more UEs, including the UEs 209, 211, 213, and 215. In the context of the invention, the base station 205 exemplifies a "main node." In other embodiments different equipment constitutes the "main node." For example, in WLAN systems, a router can operate as a main node in the context of the invention. To facilitate readability of this document, the well-known term "base station" is used herein as a generic term that covers not only base stations in the traditional sense, but also all forms of radio access nodes in all forms of radio access technologies, of which cellular communication equipment and WLAN technology are but two examples.

In the exemplary embodiment, one or more of the UEs 209, 211, 213, and 215 are to perform the task of sensing which (if any) channels are carrying a signal having a received power above some certain threshold. If a UE has no idea of which channels may have a received power level above the certain threshold, then sensing is based on no knowledge at all, or on the guesses that the UE makes. In such cases, the task of sensing takes a certain amount of time, herein denoted "A".

If the UE has an initial estimate of what the received powers of the respective possible channels will be, then the receiver may improve (i.e., reduce) its sensing time by sensing, in a single simultaneous operation, a plurality of those channels whose received power levels are estimated to be low. The goal is to simultaneously sense channels that are likely not to be in use, so that a single power measurement covering all of the channels can indicate whether this is really the case. This simultaneous sensing operation can be performed in practically the same amount of time as would be required to sense just one such channel. If the UE has a type of receiver that can combine different spectrum parts and form a single base band signal therefrom, then the plurality of channels can, but are not required to be, contiguous.

The plurality of channels to be grouped together in a single sensing operation can be selected based upon an initial estimate of received power levels, and if the estimate is close enough to the actual levels, then the UE will be able to do its sensing using only an amount of time herein denoted "B", wherein B<A.

If the initial estimate of received power level for the base band signal derived from the combination of radio spectrum parts is not close enough to the actual levels within this portion of the spectrum, then the UE will detect this while performing one or more corresponding ones of the simultaneous sensing operations. In response to this detection, the UE performs some additional sensing operations for the channels that were involved in the unsuccessful simultaneous operations. (In this context, the term "success" means that a group of channels was found that, due to their combined power being lower than a threshold level, appears not to be in use by a licensed user or by another unlicensed user.) The total time used for sensing under these circumstances is herein denoted "C", wherein C>B. It may also be true that C>A (e.g., if none of the simultaneous operations are successful) although the expected time, p(B)*B+p(C)*C (wherein "p(...)" represents a probability function) should be less than A.

It will be appreciated that the strategy of simultaneously sensing a plurality of channels can still be used even if the UE does not have an initial estimate of what the received powers of the respective possible channels will be, and that this strategy can still yield improved results over having to sense each channel individually.

Figure 3:
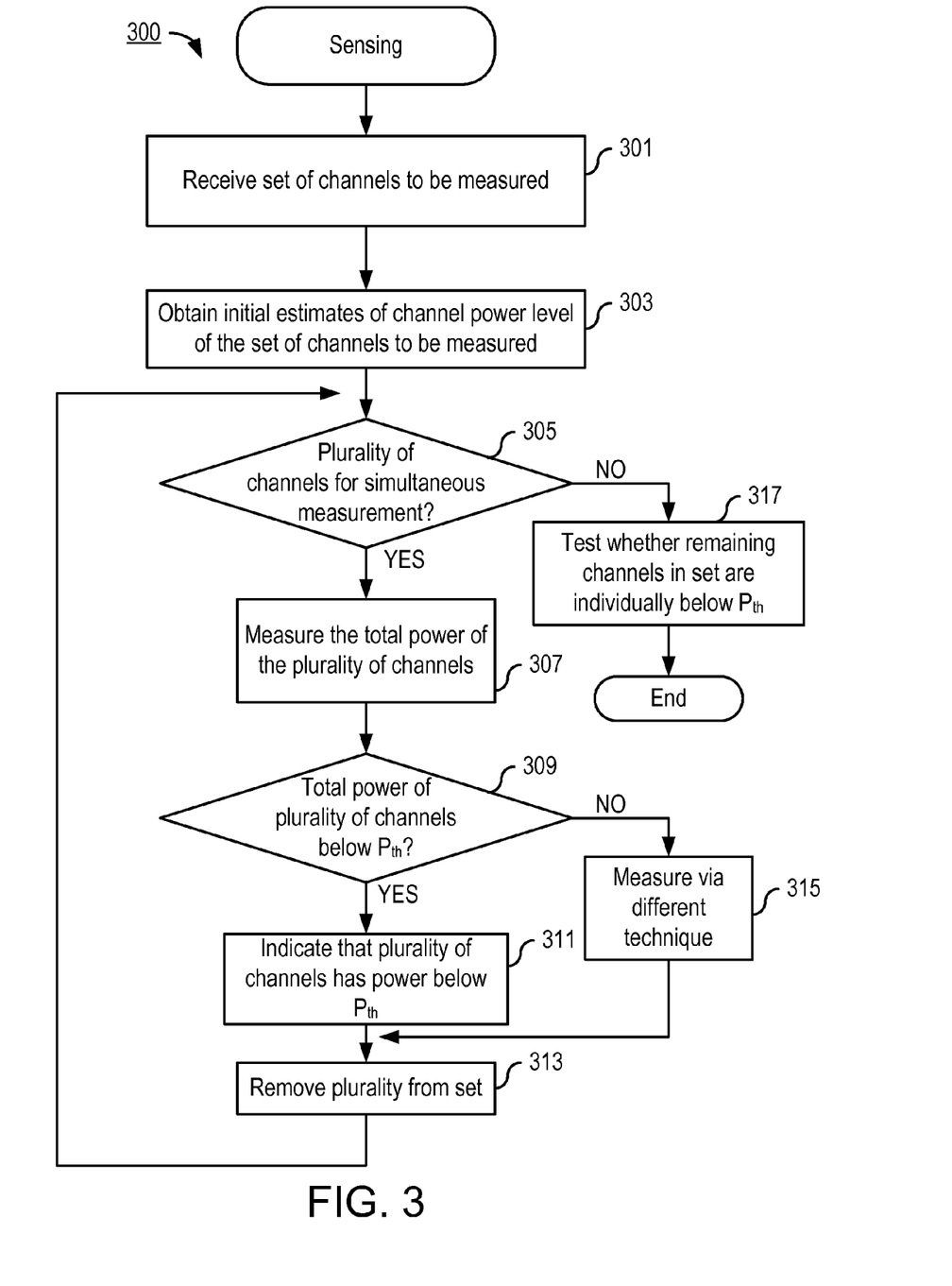
FIG. 3 is, in one respect, a flow chart of steps/processes/functions, carried out by an exemplary UE consistent with the invention to instill in the UE a radio spectrum sensing capability.

FIG. 3 is, in one respect, a flow chart of steps/processes/functions, carried out by an exemplary UE consistent with the invention to instill in the UE an efficient sensing capability. In another respect, FIG. 3 can be considered to depict the various elements of circuitry 300 configured to carry out the various functions described in FIG. 3 and its supporting text. Those of ordinary skill in the art will readily be able to design such circuitry (e.g., as programmed processors, Application Specific Integrated Circuits, other hardwired combinations of logic gates) from the functional description provided herein in combination with known design techniques.

To begin sensing, the circuitry (e.g., in a UE) receives a set of channels that are to be measured (301). The goal of this measurement is to determine which, if any, of the channels has a received power level that is below an initial estimated power level, $P_{est}$, because this is an indicator that neither the incumbent equipment nor any other unlicensed equipment is active on those channels.

The UE also obtains initial estimates of the channel power level of the various channels to be measured (step 303). The initial estimates of the channel power level for these channels can be estimates generated by the UE itself (e.g., from an earlier occasion, such as from a previous time that a sensing operation was performed). Alternatively, the estimates can be supplied by an external source, such as a server available to the UE via, for example, some (non-white space) radio network.

If the UE moves "quickly" (those of ordinary skill in the art will readily recognize that what is deemed to be "quick" movement is entirely dependent on the particular system embodiment), then the initial estimate from the UE itself may soon become outdated. Similarly, if the UE has not performed a sensing operation in the actual band for a while, then its own initial estimate may also be outdated. This harms performance because outdated initial estimates increase both p(C) and C and the sensing may, on average, take more time and/or resources/battery.

Using an external source to provide the initial estimate of channel power level $P_{est}$ instead of an initial estimate generated by the UE itself is advantageous for "quickly" traveling UEs, for UEs located in environments that are changing and/or for UEs for which the task of sensing a particular part of the spectrum is performed quite seldom.

Returning to the discussion of FIG. 3, a loop is now performed in which the channels to be measured are measured. To begin the loop, the circuitry ascertains whether there is a plurality of channels to be measured simultaneously (decision block 305). For example, the initial estimates of power may make it apparent to circuitry within the UE which group of channels is likely to have power levels sufficiently below the threshold level, $P_{th}$, that a combined measurement of these channels may still yield a power measurement below the threshold level, $P_{th}$. If there is at least one such plurality of channels ("YES" path out of decision block 305) then one of these pluralities is selected (assuming that more than one plurality of channels remain in the total list of channels to be measured), and the selected plurality of channels are received and converted together into a baseband signal whose received power level is measured (step 307). Next, a test is performed to ascertain whether the measured power level, corresponding to the plurality of channels, is below the threshold power level $P_{th}$ (decision block 309). If it is ("YES" path out of decision block 309), then it can be concluded that no incumbent equipment is transmitting on any of the channels included within the plurality of channels. Consequently, some indication is made to preserve the measurement results (e.g., the measurement results or other indication that each channel within the plurality of channels has a power level below the threshold power level, $P_{th}$, may be stored locally within the UE or alternatively communicated to a node within the communication network) (step 311). Next, the plurality of channels is removed from the list of channels that remain to be measured (step 313) and processing reverts back to decision block 305 to repeat the loop for remaining channels.

Returning to a discussion of decision block 309, if the total power of the measured plurality of channels is not below the threshold power level $P_{th}$ ("NO" path out of decision block 309), then this is an indicator that at least one (but possibly more than one) of the channels is being used by incumbent equipment. Consequently, the selected plurality of channels is measured by means of a different technique (e.g., one-at-a-time, or by dividing up the selected plurality of channels into two or more smaller pluralities of channels to be measured) to identify exactly which one(s) of the selected plurality of channels is/are being used by incumbent equipment (step 315).

At some point during execution of the loop, there is no longer a plurality of channels that can be measured simultaneously ("NO" path out of decision block 305). If there are any channels left to be measured, then these are measured individually and tested to determine whether their individual received power level is below the threshold power level $P_{th}$ (step 317). The results of that testing indicate whether the individual channel is being used by incumbent equipment (i.e., actual received power level below $P_{th}$ indicates a channel that is not being used; actual received power level at or above $P_{th}$ is considered to be in use).

The above embodiment assumed that particular channels could be identified in advance and combined in some way for simultaneous measurement. In alternative embodiments, initial estimates of channel power levels need not be known in advance. In these embodiments, the circuitry attempts to find a specific bandwidth having a total integrated power below a certain limit. The illustrated embodiment employs a recursive approach in which an attempt is made to measure an initially specified bandwidth in one step. If the initially specified bandwidth does not have a total power less than a specified threshold power level (which would indicate that the specified band is not in use), the initially specified band is divided up into N smaller bands and the process repeated for each of these bands. At some point, a band cannot be broken up into smaller bands, and the process stops for that portion of the spectrum. When the accumulated bandwidth that has been measured reaches the initially specified bandwidth the measurement task is finished.

Figure 4:
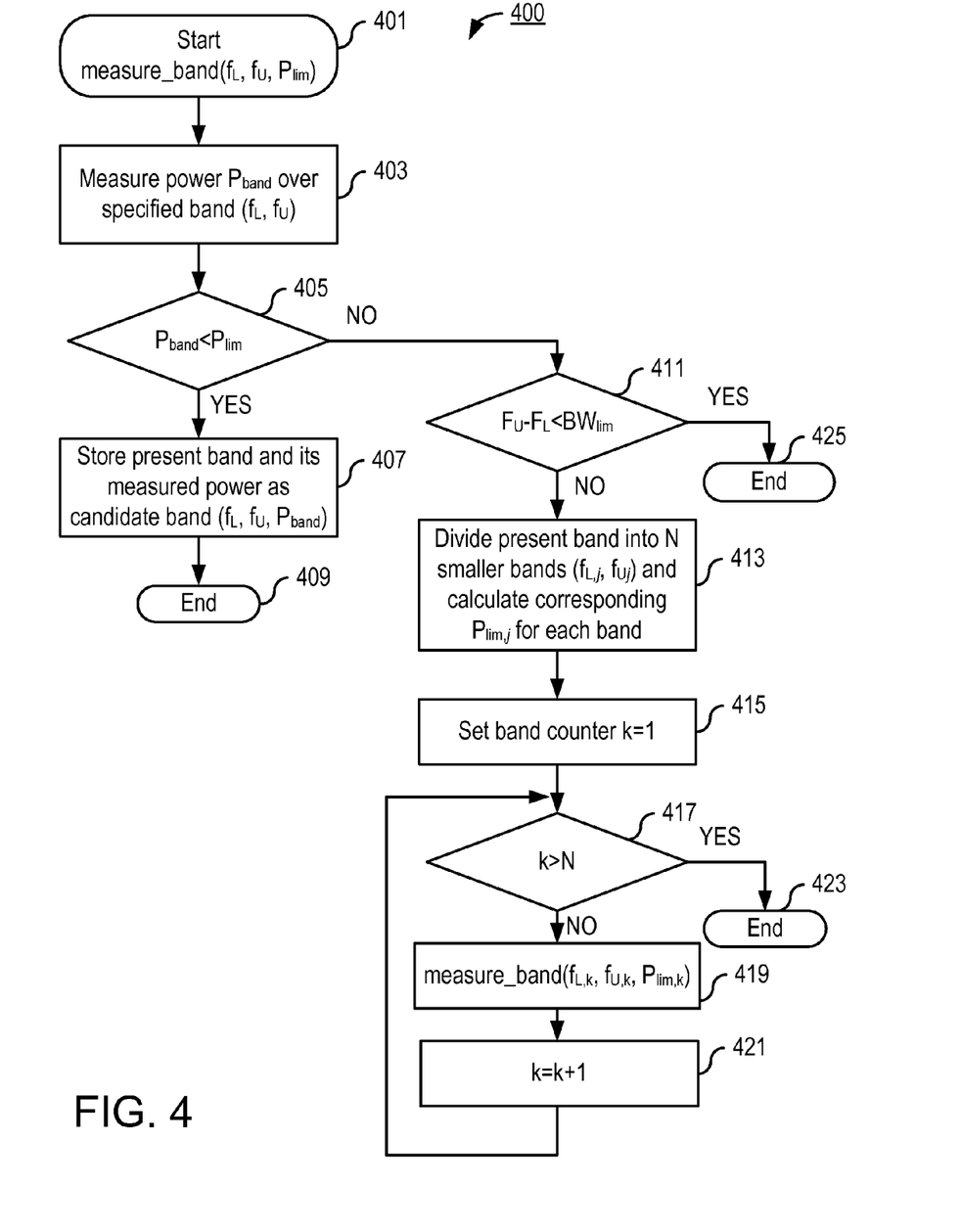
FIG. 4 is, in one respect, a flow chart of steps/processes/functions, carried out by an exemplary UE consistent with alternative embodiments of the invention to instill in the UE a radio spectrum sensing capability.

Exemplary embodiments of this alternative approach are illustrated in FIG. 4 which, in one respect, is a flow chart of steps/processes/functions, carried out by an exemplary UE consistent with the invention to instill in the UE an efficient sensing capability. In another respect, FIG. 4 can be considered to depict the various elements of circuitry 400 configured to carry out the various functions described in FIG. 4 and its supporting text. Those of ordinary skill in the art will readily be able to design such circuitry (e.g., as programmed processors, Application Specific Integrated Circuits, other hard-wired combinations of logic gates) from the functional description provided herein in combination with known design techniques.

The embodiments illustrated by FIG. 4 are especially useful for enabling circuitry to sense and consequently identify those sub-bands (if any) within a specified band (defined by a lower frequency ($f_L$) and an upper frequency ($f_U$)) whose received power levels are below a predefined threshold power level ($P_{lim}$). These identified sub-bands can be considered to be unused by any incumbent or other equipment, and can therefore also be considered to be "candidate bands", that is, frequency bands that are candidates for being used by the non-incumbent user equipment because they would not likely cause interference to any incumbent or other equipment. (It will be appreciated that it may not be possible to draw this conclusion from measurements obtained by only a single UE, and that measurements from a plurality of UEs or other sensors may be needed to reach a level of confidence that a particular sub-band is really not in use by other equipment.)

The entry point to the process is denoted measure_band($f_L$, $f_U$, $P_{lim}$) 401. To facilitate illustrating various aspects, this particular embodiment is recursive, so it will be seen later that the process actually calls (i.e., invokes) itself with different input parameters. Those of ordinary skill in the art will readily be able to derive non-recursive embodiments based on the various aspects illustrated herein.

Determining whether the specified frequency band can be considered a candidate band includes measuring the received power ($P_{band}$) of the specified frequency band (step 403) and then comparing the received power ($P_{band}$) with the predefined power threshold level ($P_{lim}$) (decision block 405). If the measured power level ($P_{band}$) is less than the threshold power level, $P_{lim}$, ("YES" path out of decision block 405), then the specific frequency band can be considered to be unused by incumbent or other equipment. Therefore, information representing (e.g., identifying) the specific frequency band along with its measured power and any mechanism for designating this as a candidate band (e.g., flag, or storage into a particular list or field of a database) are stored in any type of storage means (e.g., magnetic, electronic, optical, etc.) (step 407). Alternatively, or in addition, this same information can be provided to another process or system node that utilizes the information directly. The band measurement process then exits (step 409).

Returning to a discussion of decision block 405, if the measured power level ($P_{band}$) is not less than the threshold power level, $P_{lim}$, ("NO" path out of decision block 405), then the specific frequency band cannot be considered to be unused by incumbent or other equipment (i.e., it may be in use by other equipment). To avoid interfering with this other equipment, the UE circuitry cannot freely use the specific band. However, it may be the case that parts of the specific band are unused, and that these unused parts can be designated as candidate bands.

Therefore, the circuitry first checks to see whether the bandwidth of the specific band is less than a minimum bandwidth size (denoted "$BW_{lim}$") that can be divided into smaller usable bandwidths. If the specific bandwidth size is not smaller than the minimum bandwidth ("NO" path out of decision block 411) then it can be broken up into smaller bandwidths that can be individually sensed/measured to determine whether they are in use. Accordingly, the present specific band is divided up into a plurality, N, of smaller bands, each spanning a lower frequency $f_{L,j}$ and an upper frequency $f_{U,j}$, wherein $1 \leq j \leq N$, and a corresponding power threshold value for each of the smaller bands, $P_{lim,j}$, is determined (step 413).

The strategy now is to determine which, if any, of these smaller bands can be characterized as a candidate frequency band. In this exemplary embodiment, this is done by testing the plurality of smaller bands sequentially, although in alternative embodiments other approaches can be taken. Continuing with a discussion of this embodiment, a loop counter, k, is initialized to 1 (step 415).

The loop then begins by testing the loop counter to ascertain whether it is greater than the total number, N, of smaller bands (decision block 417). If it is not, then the smaller band that corresponds to j=k is sensed/measured to see whether the received power on this smaller band is less than the corresponding power limit, $P_{lim,k}$ for this smaller band. This is efficiently expressed and, in some embodiments implemented, by means of recursion. Specifically, the process invokes itself, but this time with input parameters that define the smaller band ($f_{L,k}$, $f_{U,k}$) and its corresponding power limit ($P_{lim,k}$). It will be appreciated that while, in some embodiments, the corresponding power limit ($P_{lim,k}$) may change in correspondence with recursion depth, in other embodiments it does not and instead remains the same throughout. When the process returns from the procedure call, it will have ascertained whether the smaller band's measured power is less than the corresponding power limit for that smaller band, and if so, will store or otherwise use this information as indicated in step 407.

When invocation of the process at step 419 has completed and control has passed back to the calling process, the loop counter, k, is incremented (step 421) and processing reverts back to decision block 417 to determine whether all of the N smaller frequency bands have been sensed/measured. If all of them have been analyzed ("YES" path out of decision block 417), the process ends (step 423).

It will be recognized that, due to the recursive nature of this process, determining whether the smaller band has a corresponding power level below the corresponding power limit may, itself, include dividing the smaller band into a number of yet smaller bands, and making individual determinations for each of these smaller bands. At some point, a band whose power is not less than its corresponding power limit cannot be (further) divided into smaller bands. When this is detected ("YES" path out of decision block 411), the present invocation of the process ends (step 425).

It will therefore be appreciated that FIG. 4 exemplifies rather generic embodiments of a measurement procedure in accordance with aspects of the invention. Such embodiments contain the parameter "$P_{lim}$" that, in the recursive approach, may be changed to "$P_{lim,j}$" in step 413 as the band ($f_{L,j}$, $f_{U,j}$) becomes smaller. However, in one group of embodiments, the parameter $P_{lim}$ can be the same as the threshold value "$P_{th}$" used in embodiments illustrated by FIG. 3 (i.e., $P_{lim,j} = P_{lim} = P_{th}$). If this is the case, embodiments exemplified by FIG. 4 may represent the "different measurement techniques" referred to in block 315 of FIG. 3. Thus, the simultaneous measurement of a plurality of channels is repeated with the same approach but over smaller frequency ranges until all of the plurality of channels has been measured.

Figure 5:
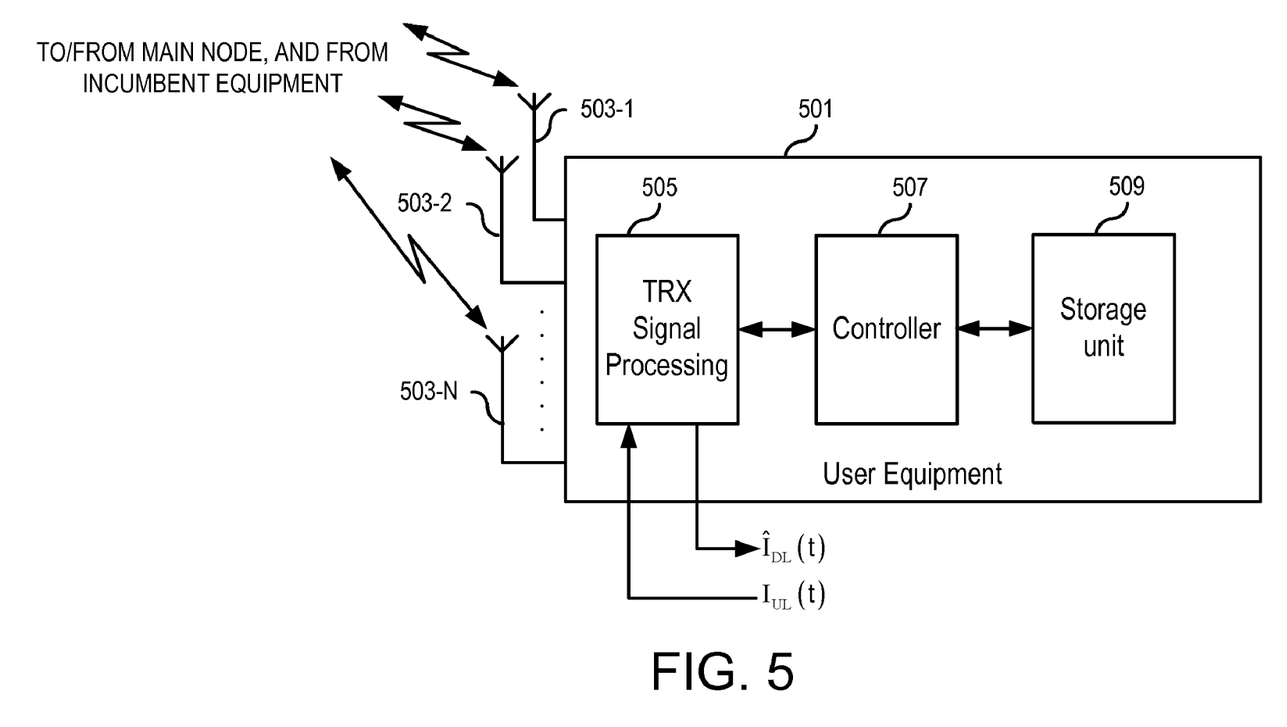
FIG. 5 is a block diagram of a UE adapted with circuitry configured to carry out the various aspects of the invention.

To further illustrate aspects of embodiments consistent with the invention, FIG. 5 is a block diagram of an exemplary UE 501 adapted with circuitry configured to carry out the various aspects of the invention. For the sake of clarity, only those components having particular relevance to the invention are depicted. Those of ordinary skill in the art will readily understand that the UE 501 also includes other circuitry (not depicted) that is well-known in the art and therefore need not be described herein.

In this example, the UE 501 employs so-called multiple-input, multiple-output (MIMO) communication technology. MIMO systems employ multiple antennas at the transmitter and receiver (e.g., the UE's antennas 503-1, 503-2, . . . , 503-N) to transmit and receive information. The receiver can exploit the spatial dimensions of the signal at the receiver to achieve higher spectral efficiency and higher data rates without increasing bandwidth. However, the use of MIMO communication technology is by no means essential to the invention; in alternative embodiments, the UE 501 could employ just a single antenna.

The base station (main node) (not shown in FIG. 5) communicates with the UE 501 via a multipath channel. In downlink transmissions, an information signal, $I_{DL}(t)$, (e.g., in the form of a binary data stream) is supplied to the base station, which applies such processes as error coding, mapping the input bits to complex modulation symbols, and generating transmit signals for each of one or more transmit antennas. After upward frequency conversion, filtering, and amplification, the base station transmits the transmit signals from its one or more transmit antennas over the channel to the UE 501.

Receiver equipment in the UE 501 demodulates and decodes the signal received at each of its antennas 503-1, 503-2, . . . , 503-N. The UE 501 includes a controller 507 for controlling operation of various UE components, including transceiver signal processing circuitry 505. The transceiver signal processing circuitry 505 demodulates and decodes the downlink signal transmitted from the base station. In the absence of bit errors, the output signal from the UE 501, $\hat{I}_{DL}(t)$, will be the same as the original downlink information signal $I_{DL}(t)$.

The UE 501 is further capable of using its transceiver processing circuitry 505 to generate a radio frequency signal from an original information signal, $I_{UL}(t)$, and to transmit this radio frequency signal to a serving base station via its one or more antennas 503-1, 503-2, . . . , 503-N. This is illustrated in FIG. 5 by means of the uplink information signal $I_{UL}(t)$ being supplied as an input to the transceiver signal processing circuitry 505.

The controller 507 is further configured to cause the UE 501 to carry out processes such as those exemplified by either of FIGS. 3 and 4. Thus, the controller 507 causes the transceiver signal processing circuitry 505, in conjunction with other circuitry in the UE 501, to perform the above-described sensing operations. In some embodiments, the results of the sensing are stored into a storage unit 509. In addition, or as an alternative, the sensing results are communicated to another node (e.g., the main node) which then takes appropriate actions based on the information. A detailed description of such actions goes beyond the scope of the invention and so will not be presented here.

Figure 6:
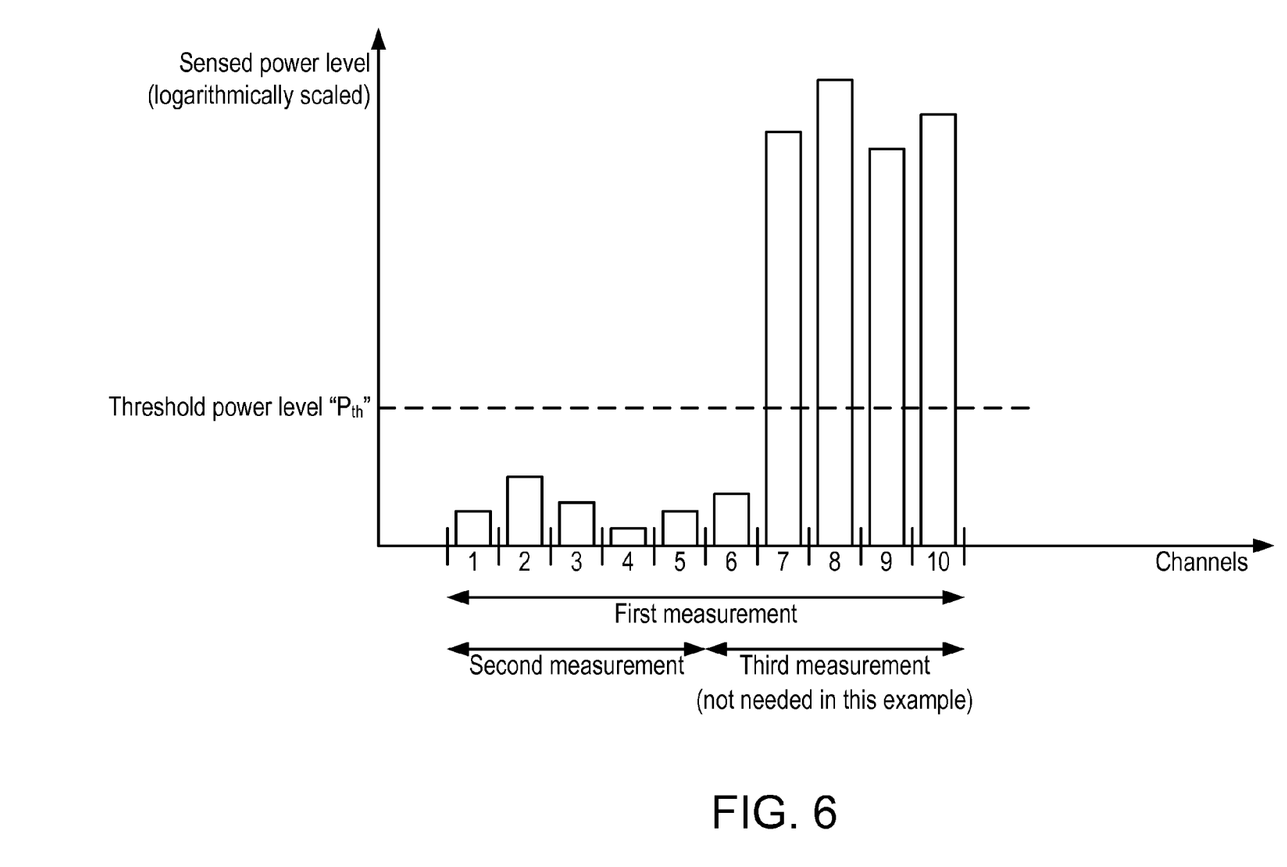
FIG. 6 is a graph showing power associated with each of a number of channels, and the measurements made on these channels in accordance with aspects of the invention.

To further illustrate aspects of embodiments consistent with the invention, an example is provided in which a number of channels are provided, some of which are being used by incumbent or other equipment, and others that are not. FIG. 6 is a graph showing power associated with each of a number of channels, and the measurements made on these channels in accordance with aspects of the invention. In this example, a UE is instructed to find five contiguous channels that would be allowable to use (i.e., such use would not interfere with an incumbent or other pre-existing user of the channels).

The UE tries to use an initial estimate to guide where it is best to start measuring (i.e., where it is most likely to find allowable channels to use). In this example, it is assumed that the UE has previously measured channels 1 through 10 and found that they were all unused. Therefore, the UE makes a first simultaneous measurement of all 10 channels to see if the total power is still below the threshold level "$P_{th}$". If this is still true, all individual channels are also still below the threshold, so any contiguous five of them would satisfy the search requirements.

However, in this example the total power within the bandwidth defined by the ten channels is higher than the threshold "$P_{th}$". This can easily be seen in FIG. 6, in which power on the vertical axis is logarithmically scaled. Because the ten channels together cannot be considered unused by other equipment, the UE divides the band up into two new pluralities, such as a first plurality comprising channels 1-5 and a second plurality comprising channels 6-10. A second measurement, performed on the first plurality of channels, shows a total power lower than the threshold "$P_{th}$", which means that the UE has found five contiguous channels, so no third measurement is needed. Thus, after only two measurement operations, the UE can report back to the requesting device (e.g., a base station). Advantages of this methodology can be seen by comparing this result with what would have been required if the UE had had to measure all individual channels (i.e., a minimum of five measurements would have been required before being able to report back a result to the requesting device).

Embodiments consistent with the invention provide a number of advantages of conventional techniques. One of these is that a UE is provided with the capability of quickly ascertaining whether a certain set of channels is available for wireless transmission.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment comprising a receiver, the method comprising:
   obtaining information about a set of channels to be sensed in a sensing process, wherein each channel is associated with a respective one of a plurality of radio frequencies;
   operating the receiver to obtain a radio frequency signal by simultaneously sensing two or more of the channels included in the set of channels;
   measuring a total power level of the sensed two or more channels;
   generating a comparison result by comparing the total power level of the sensed two or more channels with a predetermined power level; and
   controlling the user equipment based on the comparison result, wherein:
   the information about the set of channels to be sensed is information that defines a contiguous range of frequencies spanning a bandwidth large enough to be associated with two or more channels;
   operating the receiver to obtain a radio frequency signal by simultaneously sensing two or more of the channels included in the set of channels comprises operating the receiver to obtain a radio frequency signal by simultaneously sensing the contiguous range of frequencies spanning the bandwidth large enough to be associated with the two or more channels; and
   controlling the user equipment based on the comparison result comprises:
   if the total power level of the contiguous range of frequencies spanning the bandwidth large enough to be associated with the two or more channels is not less than the predetermined power level, then dividing the contiguous range of frequencies spanning the bandwidth large enough to be associated with the two or more channels into two or more smaller contiguous ranges of frequencies, each spanning a bandwidth large enough to be associated with at least one channel; and
   sensing whether each of the smaller contiguous ranges of frequencies is associated with a received power level that is less than a respective one of a plurality of lower predetermined power levels.

2. The method of claim 1, wherein controlling the user equipment based on the comparison result comprises:
   for a duration of the sensing process, inhibiting further sensing of the contiguous range of frequencies spanning the bandwidth large enough to be associated with the two or more channels if the total power level of the sensed contiguous range of frequencies spanning the bandwidth large enough to be associated with the two or more channels is less than the predetermined power level.

3. The method of claim 2, comprising:
   indicating that the contiguous range of frequencies spanning the bandwidth large enough to be associated with the two or more channels is not in use by external transmission equipment if the total power level of the sensed contiguous range of frequencies spanning the bandwidth large enough to be associated with the two or more channels is less than the predetermined power level.

4. The method of claim 1, wherein:
   at least one of the smaller contiguous ranges of frequencies spans a bandwidth large enough to be associated with two or more channels; and
   the method comprises, for each of the smaller contiguous ranges of frequencies that span a bandwidth large enough to be associated with two or more channels, operating the receiver to obtain a radio frequency signal by simultaneously sensing the smaller contiguous range of frequencies spanning the bandwidth large enough to be associated with the two or more channels.

5. The method of claim 1, wherein the plurality of lower predetermined power levels are equal to one another.

6. An apparatus for operating a user equipment comprising a receiver, the apparatus comprising:
   circuitry configured to obtain information about a set of channels to be sensed in a sensing process, wherein each channel is associated with a respective one of a plurality of radio frequencies;
   circuitry configured to operate the receiver to obtain a radio frequency signal by simultaneously sensing two or more of the channels included in the set of channels;

circuitry configured to measure a total power level of the sensed two or more channels;

circuitry configured to generate a comparison result by comparing the total power level of the sensed two or more channels with a predetermined power level; and circuitry configured to control the user equipment based on the comparison result, wherein:

the information about the set of channels to be sensed is information that defines a contiguous range of frequencies spanning a bandwidth large enough to be associated with two or more channels;

the circuitry configured to operate the receiver to obtain a radio frequency signal by simultaneously sensing two or more of the channels included in the set of channels comprises circuitry configured to operate the receiver to obtain a radio frequency signal by simultaneously sensing the contiguous range of frequencies spanning the bandwidth large enough to be associated with the two or more channels; and the circuitry configured to control the user equipment based on the comparison result comprises:

circuitry configured to divide the contiguous range of frequencies spanning the bandwidth large enough to be associated with the two or more channels into two or more smaller contiguous ranges of frequencies, each spanning a bandwidth large enough to be associated with at least one channel, if the total power level of the contiguous range of frequencies spanning the bandwidth large enough to be associated with the two or more channels is not less than the predetermined power level; and circuitry configured to sense whether each of the smaller contiguous ranges of frequencies is associated with a received power level that is less than a respective one of a plurality of lower predetermined power levels.

7. The apparatus of claim 6, wherein the circuitry configured to control the user equipment based on the comparison result comprises:

circuitry configured to inhibit further sensing of the contiguous range of frequencies spanning the bandwidth large enough to be associated with the two or more channels for the duration of the sensing process if the total power level of the sensed contiguous range of frequencies spanning the bandwidth large enough to be associated with the two or more channels is less than the predetermined power level.

8. The apparatus of claim 7, comprising:

circuitry configured to indicate that the contiguous range of frequencies spanning the bandwidth large enough to be associated with the two or more channels is not in use by external transmission equipment if the total power level of the sensed contiguous range of frequencies spanning the bandwidth large enough to be associated with the two or more channels is less than the predetermined power level.

9. The apparatus of claim 6, wherein:

at least one of the smaller contiguous ranges of frequencies spans a bandwidth large enough to be associated with two or more channels; and the apparatus comprises, circuitry configured to operate the receiver to obtain a radio frequency signal by simultaneously sensing the smaller contiguous range of frequencies spanning the bandwidth large enough to be associated with the two or more channels for each of the smaller contiguous ranges of frequencies that span a bandwidth large enough to be associated with two or more channels.

10. The apparatus of claim 6, wherein the plurality of lower predetermined power levels are equal to one another.

* * * * *

UNITED STATES PATENT AND TRADEMARK OFFICE
CERTIFICATE OF CORRECTION

PATENT NO. : 8,311,483 B2
APPLICATION NO. : 12/720281
DATED : November 13, 2012
INVENTOR(S) : Tillman et al.

It is certified that error appears in the above-identified patent and that said Letters Patent is hereby corrected as shown below:

In Column 6, Line 14, delete ""p(...)"" and insert -- "p(..)" --, therefor.

In Column 9, Line 12, delete "$P_{limj}$," and insert -- $P_{limj}$ --, therefor.

In Column 10, Lines 44-45, delete "transceiver processing" and insert -- transceiver signal processing --, therefor.

Signed and Sealed this
Second Day of April, 2013

Teresa Stanek Rea
*Acting Director of the United States Patent and Trademark Office*